United States Patent
Romeu

(10) Patent No.: US 6,626,128 B2
(45) Date of Patent: Sep. 30, 2003

(54) FEED DOSER AND REGULATOR FOR TROUGHS

(75) Inventor: Gener Romeu, Agramunt (ES)

(73) Assignee: Rotecna S.A., Agramunt (ES)

( * ) Notice: Subject to any disclaimer, the term of this patent is extended or adjusted under 35 U.S.C. 154(b) by 0 days.

(21) Appl. No.: 09/984,385

(22) Filed: Oct. 30, 2001

(65) Prior Publication Data

US 2002/0088404 A1 Jul. 11, 2002

(30) Foreign Application Priority Data

Nov. 3, 2000 (ES) .......................................... 200002733

(51) Int. Cl.$^7$ ............................................... A01K 61/02
(52) U.S. Cl. ...................................................... 119/56.1
(58) Field of Search ........................... 119/53, 53.5, 54, 119/56.1, 61, 72, 74, 75

(56) References Cited

U.S. PATENT DOCUMENTS

| | | | | |
|---|---|---|---|---|
| 3,088,437 A | * | 5/1963 | Willems | 119/56.1 |
| 3,319,832 A | * | 5/1967 | Prentice | 119/56.1 |
| 3,812,823 A | * | 5/1974 | Ridder et al. | 119/54 |
| 4,242,985 A | * | 1/1981 | Freeborn | 119/54 |
| 4,829,935 A | * | 5/1989 | Gray | 119/54 |
| 4,913,096 A | * | 4/1990 | LeBlanc et al. | 119/53.5 |
| 5,255,631 A | * | 10/1993 | Anderson | 119/52.2 |

* cited by examiner

Primary Examiner—Thomas Price
(74) Attorney, Agent, or Firm—Sughrue Mion, PLLC

(57) ABSTRACT

Feed dosing and regulating system for troughs comprising: a chassis and a body; at least one rod joined by its two ends to both vertical angular rods; at least one ramp which is moveable outwardly and inwardly, with its lower edge facing a feed support plate; at least one cam with a lower horizontal shaft, projecting on one side in cooperation with the corresponding lever and articulated higher up to a horizontal shaft joined to a pipe that can be moved vertically; a vertical shaft that can turn and can be slid inside the pipe and has an eccentric wheel fixed onto its lower end; at least one tilting flap on a vertical plane and situated inside the trough hopper; and a cover with a motor equipped with a lower projecting pin onto which the upper end of the vertical shaft can be assembled.

17 Claims, 10 Drawing Sheets

FEED DOSER AND REGULATOR FOR TROUGHS

FIELD OF THE INVENTION

The object of the present invention patent is a feed doser and regulator for troughs, used for feeding stabled animals, especially pigs. The dosing and regulating system enables the dosage and regulation of the amount of feed or food to be automated, which the animal itself seeks by actions of the same on a part of the system arranged for it.

BACKGROUND TO THE INVENTION

Dosing systems assembled in the inner part of the troughs to which they apply are known, supplying a predetermined amount of feed which, coming from the feeder tank, passes through the doser and falls onto a feed pan from which the corresponding animal eats.

The known troughs for the feeding of livestock, especially pigs, in broad outline present a tank for temporarily storing the food or feed, which on the lower part extends into a hopper which also contains the feed and which is joined at the lower base of the tank. A feed dosing device is located at the smaller or lower base of the hopper, which is controlled by a regulator for setting, from a maximum to a zero position, the amount of feed to supply for each animal's action on a part which the doser presents for such purpose.

As is shown, the food portions supplied fall into a pan or tray which the trough has at its base. Above the pan there is normally a drinking trough which, when activated by an animal, supplies a certain amount of a liquid (in general water, in this case mixed with products for health or nutritional products) which are also poured onto the pan. The transporting of the liquid supply has a control valve of the same. Thus moist foodstuff is obtained.

Regulators equipped with a turning lever and arranged at the upper or lower part of the feeder tank are also known, which is connected to a vertical rod, so that the turning of the lever causes the rod to go down or up by an order of the function of the angle turned by the lever. The latter is assembled on a support joined to the feeder tank.

Basically, three types of these regulators are known: one with a vertical lever and a lower toothed part, arranged on its edge according to an ideal off-centre curve situated on a vertical plane, between whose teeth the upper end of the rod is inserted according to the position of the turning lever, which is joined to the feeder tank through a support which puts it into the tank in a radial manner; another, in which among some other features simplifying its constitution, has the lever toothed on its off-centre edge with a support of the same arranged perpendicularly to the feeder radius; and a third with a horizontal lever, which has a circular ramp at its base against which the upper end of the rod is supported and whose descending or ascending movement is a function of the lever's turning angle.

A known doser is basically composed of a turning plate around an upper horizontal shaft, an inner pusher joined to the plate or forming part of it but situated behind, a support swept along by the pusher and practically bent according to the path it takes, and an opening for the feed dragged by the pusher to pass through which will fall into the feed pan or tray.

When a pig wants to eat, it activates, as many times as it likes, the tilting plate (with a turning angle controlled by the regulator and situated in the position provided for by the farmer) and the pusher move the corresponding amounts of feed which thus drop onto the feed pan.

Apart from the possibility of the feeder being supported on the stable floor it has means for being anchored to a wall or vertical panel, thus preventing it from falling or being moved by the animals' usual pushing movements.

When they are very young animals, the activating of the feeder tilting plate by pushing its snout against the same is, on the one hand, relatively difficult and laborious for the animal and, on the other hand, takes time to learn. Likewise, for older animals it can be unpleasant because of the effort they have to make by repeated knocking of the plate and the physical discomfort it entails for them.

SUMMARY OF THE INVENTION

The feeders to which the feed dosing and regulating system apply according to the invention are of the type comprising a tank for temporarily storing the feed and a lower hopper, at the base of which there is a feed doser device, controlled by a regulator that has a vertical rod for regulating, as the farmer wishes, the amount of food to be supplied by each animal's action on a tilting part of the doser, from a maximum position to a zero position.

This feed dosing and regulating system for troughs is characterised by comprising:

a) A chassis and a body in which there is arranged, opposite and facing, at least one outer rod on each side of the body with its two ends joined to both vertical angular levers, facing each other and articulated to said body; the two levers of each rod have an upward cut-out on their inner vertices and a downward extension facing the side of the lever pointing downwards;

b) two rectangular ramps, joined to each other on their upper part, determining a common horizontal ridge and articulated to the body; both ramps are moveable, contrarily and symmetrically, outwardly and inwardly and their lower edges have throughout the ramps' entire course, together with the upper surfaces, fixed plates for feed temporary support;

c) two cams, each of which has its lower end joined to a horizontal shaft that extends outwards, being positioned opposite a wing of the corresponding angular lever and each lever has its upper end articulated to a horizontal shaft;

d) a vertical pipe that can be moved upwards and downwards and onto whose intermediate part is joined the horizontal shaft on each of whose two branches is articulated the respective cam by its upper end;

e) a vertical shaft that can be slid on the inside of the pipe and which has a fixed eccentric wheel to the same at its lower end and can turn on a horizontal plane and is capable of positioning itself between the two ramps, whose shaft can turn thanks to actuating means; and f) means located at the upper part of the body for joining to the lower part of a feeder hopper, preferably made up of a vertical neck.

In an embodiment case, the feed dosing and regulating system for troughs is characterised by having a rod situated to just one side of the system, a ramp arranged over a feed temporary support plate, a cam situated opposite the ramp, a single branch of the horizontal shaft joined to the vertical pipe and an eccentric wheel fixed to the vertical shaft and facing the ramp.

Likewise, the feed dosing and regulating system for troughs is characterised by having:

g) at least one tilting flap, articulated horizontally at its upper end inside said hopper and activated in its free part by a rod which crosses a hole in the hopper and articulates lower down to the corresponding angular lever;

h) a cover, capable of being coupled to the tank or directly to a feeder hopper and which has a motor with a lower projecting pin, onto which the upper end of the vertical sliding shaft can be assembled;

i) linking means joined lower down to the upper part of the vertical pipe and higher up to a corresponding control, arranged over the cover for actuating upwards or downwards; and j) a tray for receiving the unloaded feed, provided with a central part projecting upwards and sloping towards an area on the edge of the tray, the latter determining a feed collection channel.

The feed dosing and regulating system for troughs according to the invention offers, among other things, the following exclusive and peculiar advantages of the same: working the system is carried out by the swinging movement of the animal's head; working smoothness, as it does not require the animal to hit its snout against the conventional tilting plate; it can be used both for weaning and fattening animals; the animals can see the feed, which motivates them to access the same; the feed that is unloaded by the dosing and regulating system is situated next to the feed pan periphery and very near to the animal that has activated the system, so that it neither falls over the animal's snout nor scatters outside the feed pan as has happened up to now, with the resulting greater use of the feed and cost saving; it stops the animal from treading on the feed, with the resulting improvement in the facilities' hygiene; it makes it easier to make savings in the cleaning of the facilities, with an increase in the hygiene of the same; it makes it possible to automate the dosage and regulation of the feed; the feed arranged in the hopper is shaken automatically every time the animal activates the system to obtain the food so that the possible "gaps" which could form in the feed, especially between the food and the hopper walls; and the whole system, together with the feeder, can be turned over with respect to the chassis, enabling an easy and thorough cleaning.

DESCRIPTION OF AN EMBODIMENT ACCORDING TO THE INVENTION

In accordance with the drawings, the feed dosing and regulating system for troughs is applied to a feeder -1- (FIG. 1) of the type comprising an upper tank for temporarily storing the feed and a lower hopper, at whose smaller and lower base is located a feed dosing device, controlled by a regulator that has a vertical rod for regulating the amount of food to be supplied for every animal's action on a tilting part of the doser, from a maximum position to a zero position.

Figure 1:
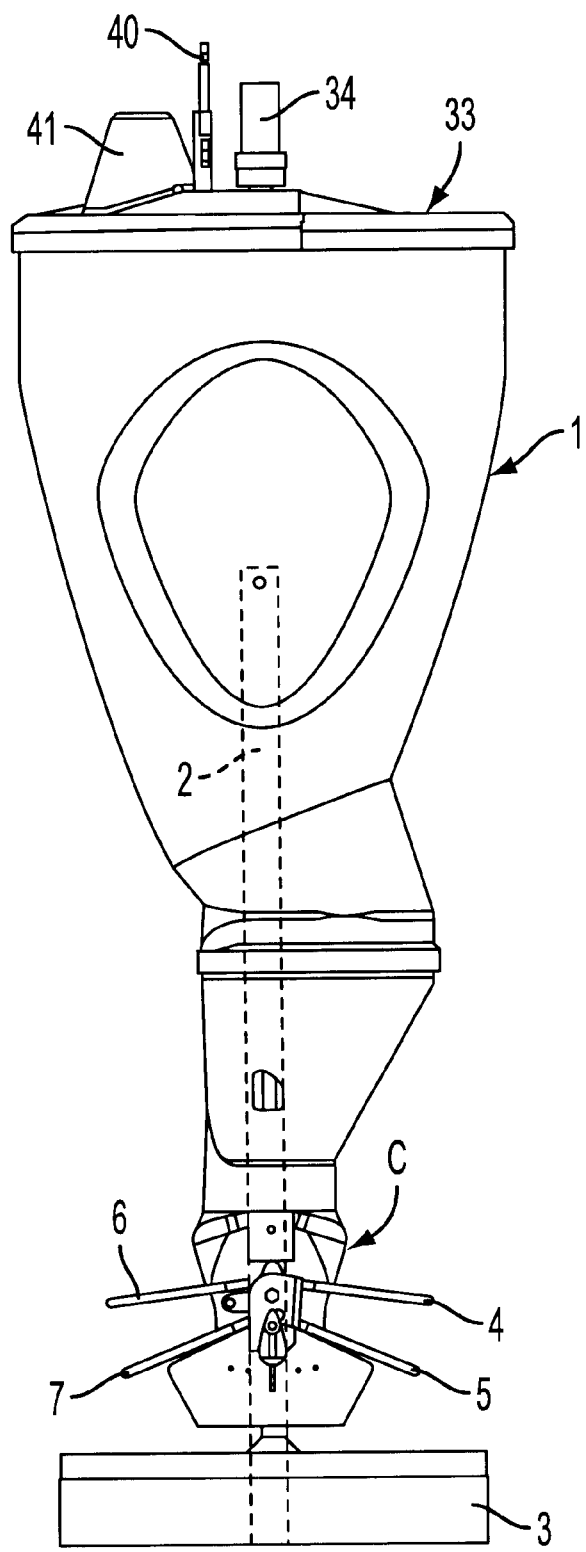
FIG. 1 shows an elavational side view of a feeder fitted with the feed doser and regulator object of the invention.

The feed dosing and regulating system according to the invention comprises a chassis -2-, represented in FIG. 1 as regards its rear part (which corresponds to the right-hand side of the chassis), its front part having been eliminated for the greater clarity of the assembly. This chassis has two columns, the upper part of which is articulated to the feeder and equipped lower down with a base (not shown) for its support and fastening to the floor. The chassis can be constituted by any other structure that allows the feeder's support with its lower feed pan or tray -3-, as well as the turning of this assembly with respect to the chassis, for its possible emptying and for its cleaning.

Figure 8:
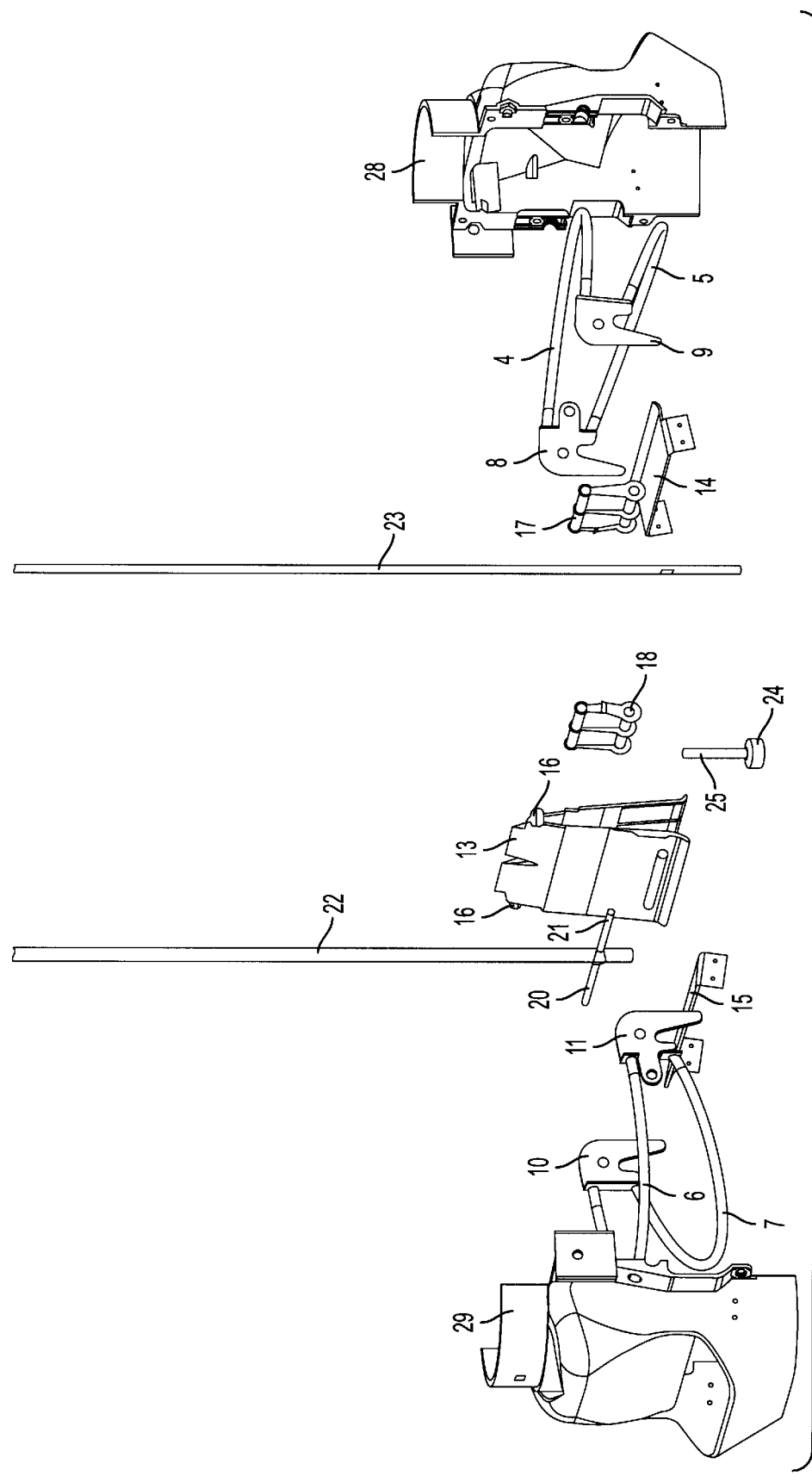
FIG. 8 is a exploded, perspective view, at a samaller scale, of the two parts, left and right, the joining of which forms the system body and the regulation means.

In this example, the system has a body -C- as if it were a housing made up of two parts (FIG. 8) joined to each other. Both pairs of exterior rods -4- and -5-, -6- and -7- are arranged, opposite and facing each other and each pair is situated at each side of the body system, so that the rods of each pair are arranged at a different height to each other. The rods can adopt different configurations, such as a curved shape on the outside, a slightly rectangular shape on the outside, etc., provided that they allow their function of being able to be worked by the stabled animals.

Figure 4:
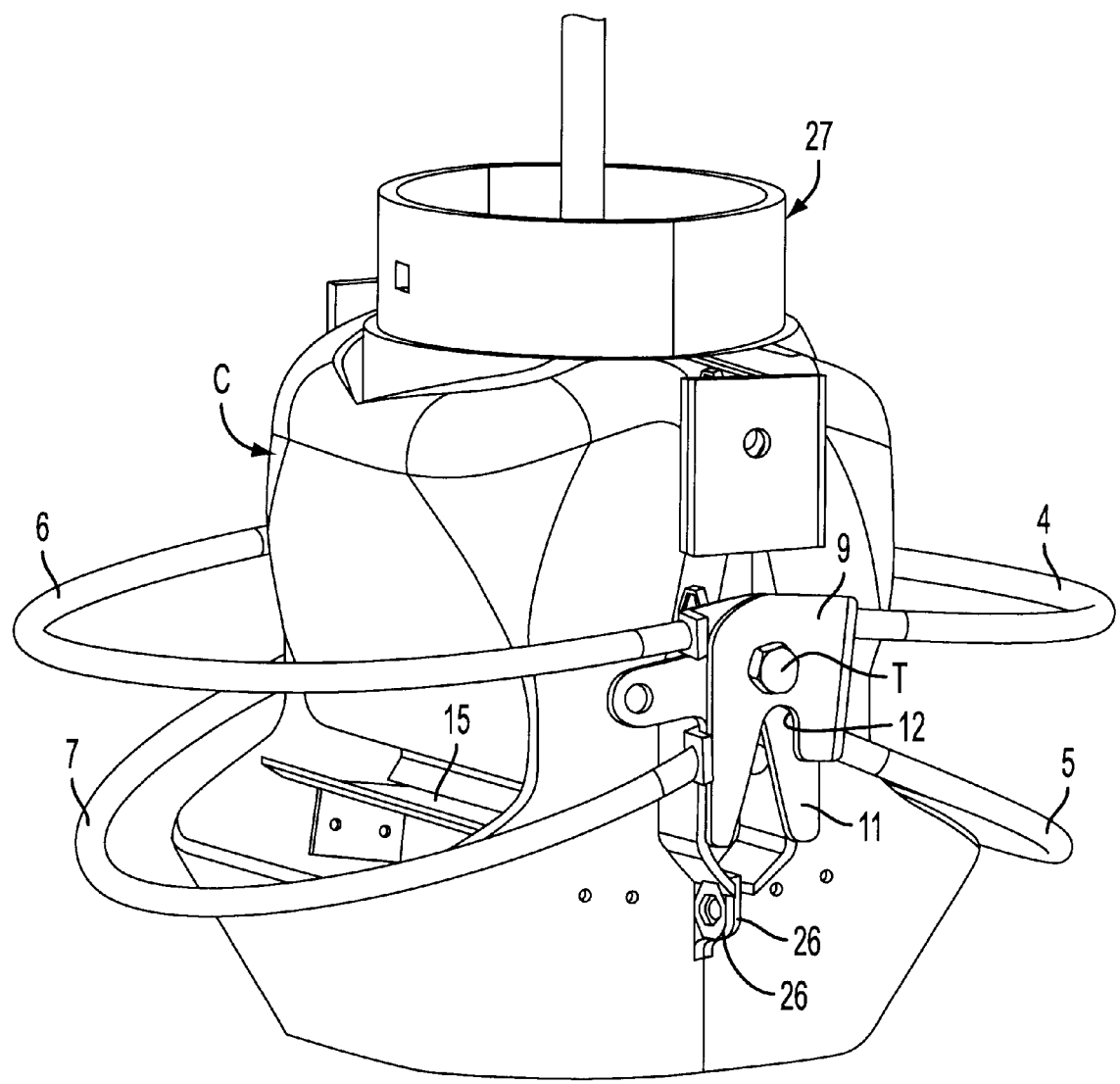
FIG. 4 represents a perspective view of the lower part or body of the system, incorporated to the feeder of FIG. 1 and enlarged.
Figure 5:
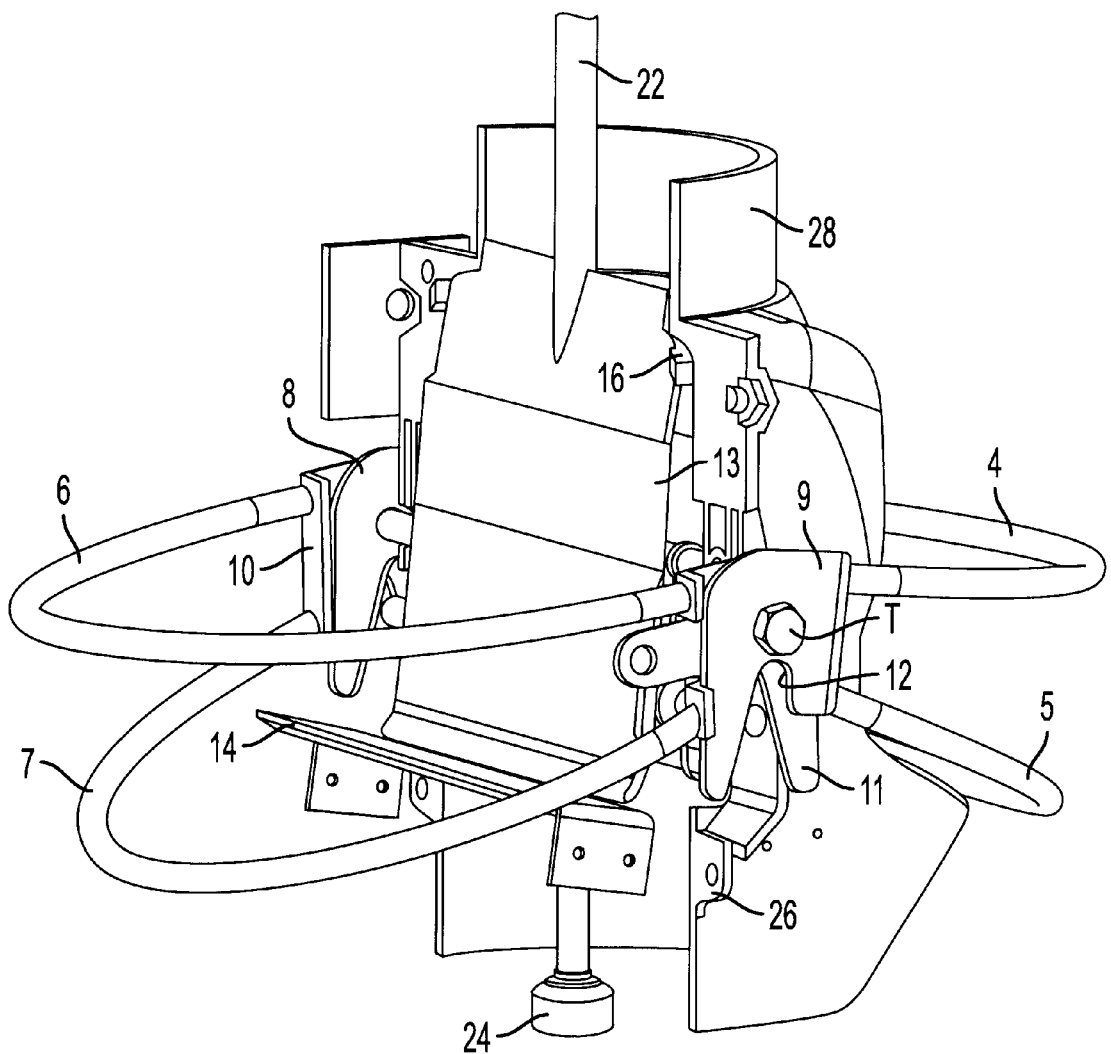
FIG. 5 is a partial vertical section view of FIG. 4, showing details of the right-hand part of the body system.
Figure 6:
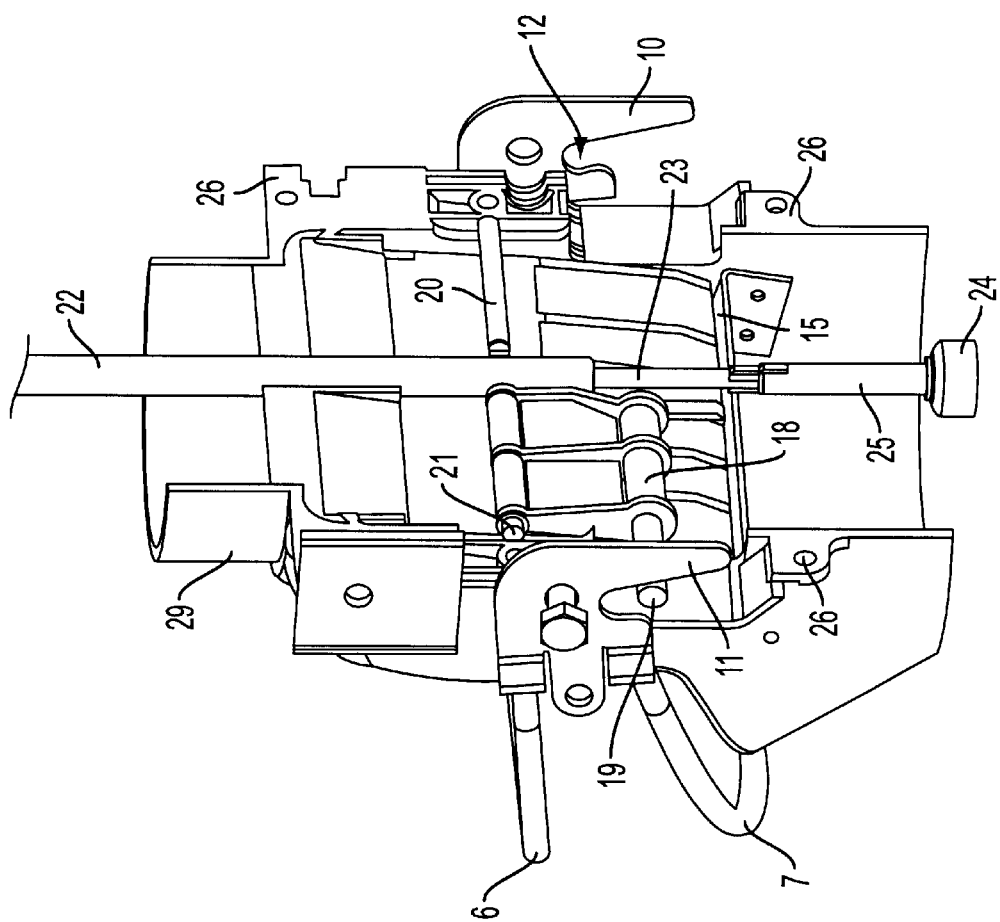
FIG. 6 is a vertical perspective section of the left part of the body, showing details of its interior and which will be joined to the right-hand part of FIG. 5, forming the system body.
Figure 7:
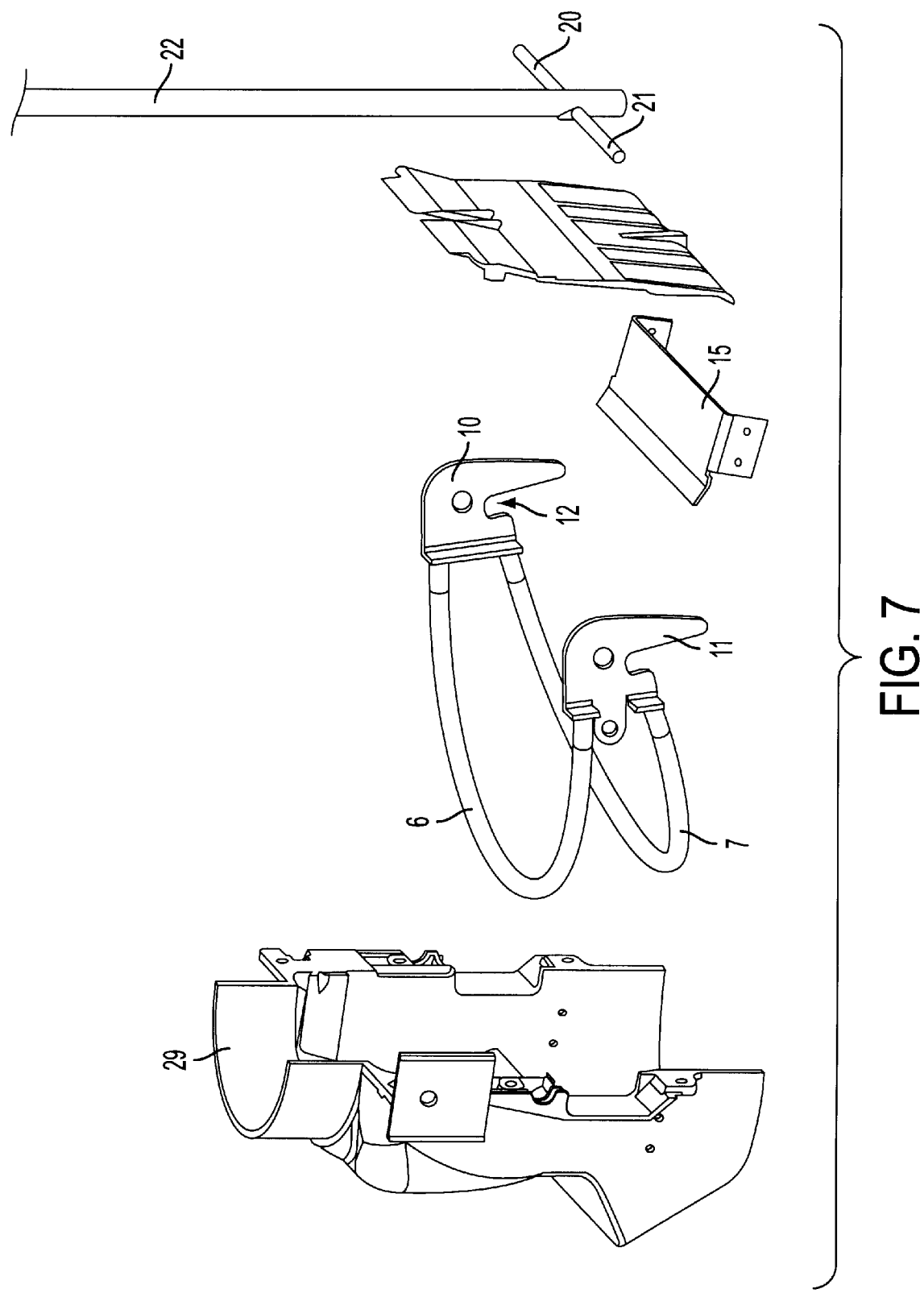
FIG. 7 shows, in perspective and at a smaller scakle, an exploded view of FIG. 6 with several elements from the same.

The two ends of each rod of each one of the two pairs are joined to respective levers -8- and -9-, -10- and -11- (FIGS. 5, 6, 7 and 8) which are angular, vertical and articulated to the body -C- of the system. The levers have an upward cut-out -12- on their inner vertex, as well as a downward extension facing the side pointing downwards from the lever. Likewise, the levers are juxtaposed in twos (-8- and -10-, -9- and -11-) and going through each of these two pairs is a respective screw functioning as a turning shaft, such as screw -T-in FIGS. 4 and 5 for the levers -9- and -11- which screw into a nut which is not shown.

Inside the body and articulated to the same are two rectangular ramps -13- (FIGS. 8 and 5) joined to each other on their upper part according to a common horizontal ridge. They are moveable, contrarily and symmetrically, outwardly and inwardly as will be explained later, and their lower edges have, throughout their entire path, together with the upper surfaces, fixed plates -14- and -15- (FIGS. 5, 6, 7 and 8) for temporary feed support and which are joined, respectively, to each of the two parts that make up the body -C-.

The two ramps -13- can be of a single-piece (FIG. 8), preferably a plastic material, bent in half or two pieces joined to each other at their upper end. Whatever the case may be, they must have means for hanging them by their upper articulation (or in the vicinity) of the body of the system, means -16- (FIGS. 5 and 8) which in this example are conformed in the ramps and are co-ordinated with others from the body itself; these ramps having to have a certain elasticity in order to be able to recover their rest position after having been outwardly distorted, as will be explained later.

The system comprises two cams -17- and -18- (FIGS. 8 and, in part, 6) that can act on each of the two ramps. Each cam has its lower end joined to a horizontal shaft, such as shaft -19-, which extends outwards and is situated facing the longer wing of the corresponding angular lever, such as lever -11-. Each cam has its upper end articulated to a respective horizontal shaft -20- and -21-, both shafts being aligned and fixed perpendicularly to the vertical tube -22- (FIGS. 6, 7 and 8), and both shafts may constitute a single shaft. This pipe is moveable downwards and upwards, as will be described later.

Also, a vertical shaft -23- (FIGS. 6 and 8), capable of sliding inside pipe -22- and fitted at its lower end has an eccentric wheel -24- fixed to the same, which can turn on a horizontal plane. The shaft -23- can turn thanks to activating means which shall be described later. As can be easily deduced from FIGS. 6 and 8, the eccentricwheel -24- is fixed to a short pipe -25-, fitted on its upper part with adjusting means with those of the lower part of shaft -23-, which tightly fix the eccentric wheel with the shaft both in a vertical direction and in the turning direction.

Figure 2:
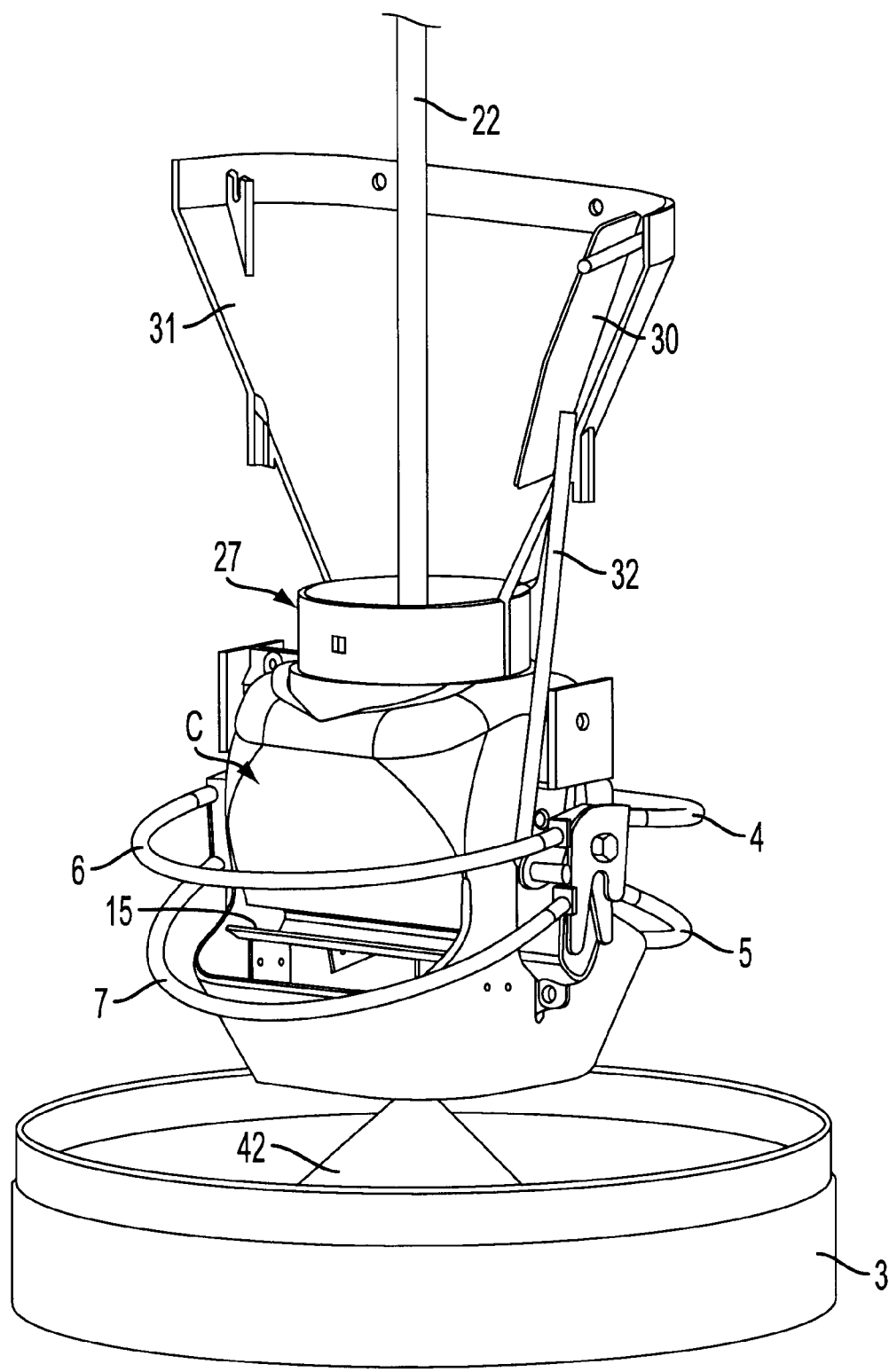
FIG. 2 is a partially sectioned perspective view without the upper part of the feeder of FIG. 1 and enlarged.

The two parts composing the body -C- of the system are joined to each other by lugs, like lugs -26- (FIGS. 4, 5 and 6), perforated in order for the corresponding screws with nuts or other conventional means (not shown) to go through, including welding. A vertical neck -27- (FIGS. 2 and 4) exists on the upper part of the body -C-, the two halves -28- and -29- of the neck belonging to the respective two parts of the neck, as can be observed in FIGS. 5, 6, 7 and 8.

The constitution of the body -C- and of its internal elements, comprised in the feed dosing and regulating system for troughs, enables the animals to be fed to see the feed deposited temporarily on the support plates -14- and -15- of the same. It should be pointed out that the animals, although they can see the food deposited on the plates, cannot have direct access to the same because the rods -4- and -5- or -6- and -7- prevent it, so that if they want to eat they have to activate them by the natural swinging movement of their head, the feed falling on the same side in which the animal is to be found, which at that moment activates the corresponding rods.

Obviously the feed dosing and regulating system for troughs could be applied to the case of there being a need for the animals to have access on one side only. Then the system would have one or two rods located on only one side of the system, a ramp arranged over a temporary feed support plate, a lever situated facing the ramp, a horizontal shaft joined to the vertical pipe and with just one branch and an eccentric wheel-fixed to the vertical shaft.

On the other hand, the feed dosing and regulating system for troughs can have at least one tilting flap -30- (FIG. 2), articulated horizontally on its upper part on the inside of the hopper -31- and activated, on its free part, by a rod -32- which goes through an orifice in the hopper and is articulated lower down to the corresponding angular lever, so that the raising of the rods -4- and -5- by the action of an animal's head or snout causes the raising of the rod -32- and, therefore, the turning of the flap -30- bringing about the shaking of the feed contained in this part of the hopper, so that it will break the possible "gaps" that could form in the feed, especially between the food and the hopper walls.

A cover -33- (FIGS. 9 and 10) is provided, capable of being coupled to the hopper -31- or to a feed tank. The top has a vertical motor -34- (electrical, hydraulic, with gearbox, etc.), fitted with a kind of pin -35- which protrudes below the top and has a transversal orifice, into which the upper end can be fixed and suitably bent from another rod -36-, in which the shaft -23- ends further up, which could be bent—depending on its diameter and material—in the same way, the rod -36- being removed.

The cover-33- has one or more protuberances on its upper part, such as the protuberances -41- preferably shaped like a truncated cone, enabling it to be cut horizontally for its adaptation to distinct diameters of the feeding means of fodder to the hopper or to the deposit.

Figure 9:
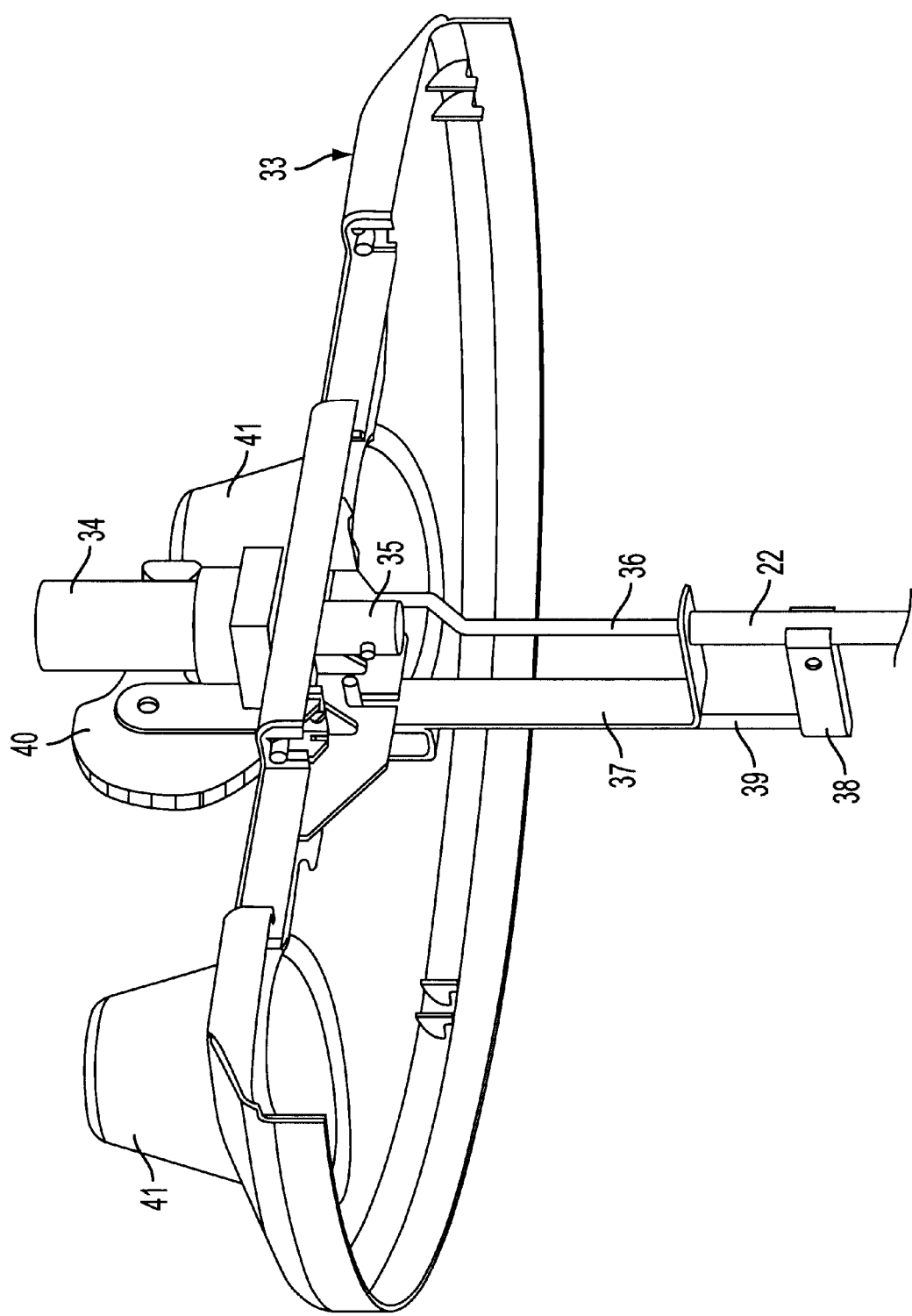
FIG. 9 is a partially sectioned, perspective view of the top which closes the upper mouth of the feeder, with the regulating means worked by a motor.
Figure 10:
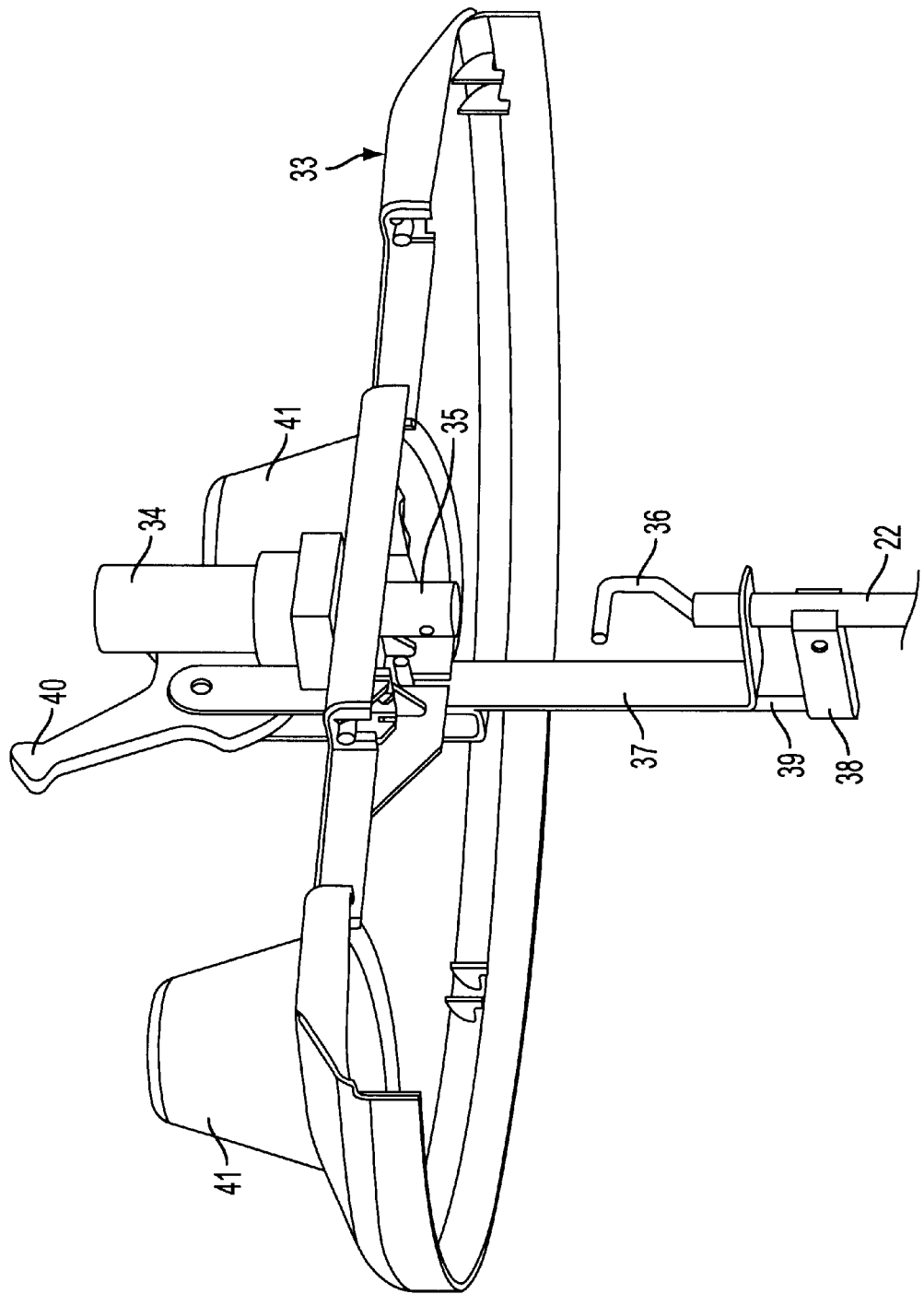
FIG. 10 corresponds to a view like the one in FIG. 9, but with the regulating means activated by a manual control.

When the farmer starts the motor -34-, starting from the position shown in FIG. 9, the rod -36- turns and consequently the shaft -23- and the eccentric wheel -24- turn. Since the latter, which has been raised from its rest position, is positioned between the two ramps -13-, its rotation causes an alternating outward movement from one ramp and the other, which recover alternatively inwardly because of their natural elasticity when the eccentric wheel stops supporting its projecting area during its continual turn. The starting and stopping of the motor -34- can be controlled by a system that can be programmed by the farmer, according to the feeding needs of the animals.

The pipe -22- is led higher up into a guide -37- (FIG. 10) which lets it slide through and is held by a horizontal gripper -38- joined to a rod -39-, which is activated on descent or ascent by the turning, at will, of the manual lever -40- which is provided of an eccentric toothing . It must be pointed out that in this case of manual activating the rod -36- has to be disconnected from the motor -34-, so that it falls and descends below the two ramps -13-, in other words, it does not act on them, and remains in its rest position.

The raising of the rod -39- by the action of the farmer on the lever -40- makes the tube -22- rise and, through this, the lifting of the two horizontal shafts -20- and -21- which upwardly drag the two levers -17- and -18-. In this situation, when an animal lifts its head under, for example, the rod, or rods -6-, -7-, it results in the corresponding turning of the levers -10- and -11-, so that the lever -11- (FIG. 6) drags the shaft -19- and in this way turns the corresponding lever -18-, which pushes one of the two ramps -13- outwards, thus dragging a certain amount of feed located on the plate -15- which is unloaded onto the feeding tray -3-. The release of the feed into the tray will occur as many times as the animal repeats its action on the rods and the amount of feed discharged is a function of the height of the tube -22- with its horizontal shafts -20- and -21-, so that the higher or more raised these shafts are situated, the greater the amount of feed discharged in each action by the animal, and vice-versa.

Figure 3:
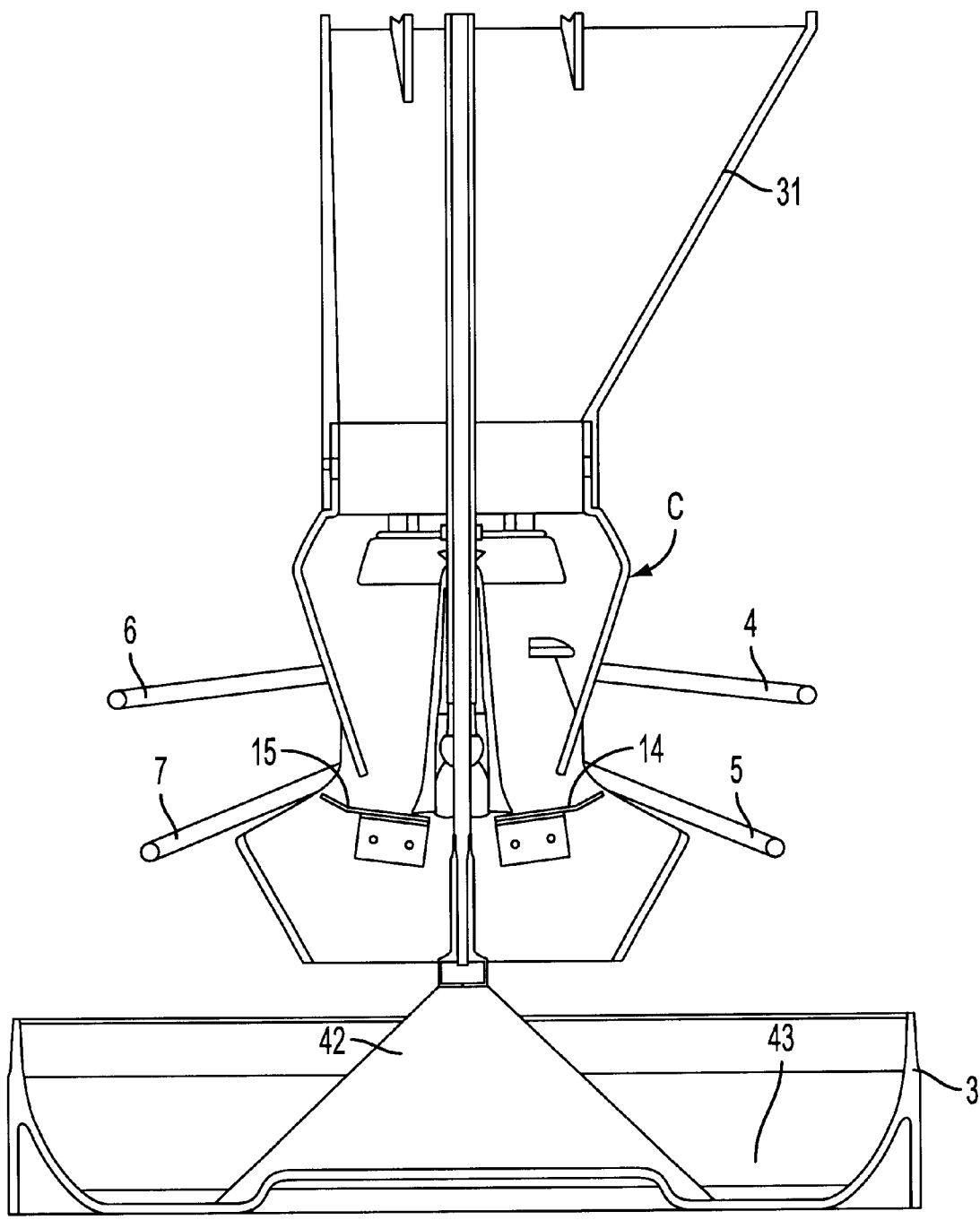
FIG. 3 corresponds to a vertical section of the feeder of FIG. 1 without the upper part and enlarged.

The feeding tray -3- (FIGS. 1, 2 and 3) for the final receiving of the feed which is released onto the same for the animals' direct feeding, is provided with a central part -42- projecting upwards and with a frustoconical shape. The slope of this central part -42- is dimensioned in such a way that its lower base ends in an area close to the tray edge, forming, with this edge, a feed collection channel -43-.

In this way the feed released into the tray ends up very near to the animal that has activated the system through the rods -4- and -5- or -6- and -7- or else the feed collected in the tray by the automatic action and in a programmed case, of the turning of the eccentric wheel -24- as has already been explained. Thus the feed released into the tray does not fall onto the animal's snout and is not scattered or trodden on by it outside the tray, as it does not have to get stuck into it in order to eat the feed, as it only has to lower the head towards channel -43-.

It must be stated that, in the embodiment of the object of the present invention, it shall be possible to apply all the variations in detail which experience and practice recommend with regard to shapes and dimensions, both absolute and relative, materials employed and other circumstances of an incidental nature, as well as being able to introduce as many constructive detail modifications compatible with the essence of that claimed, as it all remains comprised in the spirit of the following claims.

What is claimed is:

1. A feed dosing and regulating system for troughs, comprising:
    a body,
    at least two outer rods, including at least a first rod and a second rod,
    a pair of first vertical levers, wherein one end of the first rod is joined to one of the pair of first vertical levers and the other end of the first rod is joined to the other of the first pair of vertical levers;
    a pair of second vertical levers, wherein one end of the second rod is joined to one of the pair of second vertical levers and the other end of the second rod is joined to the other of the second pair of vertical levers;
    wherein the levers of each pair of levers face each other and are articulated to the body; and wherein at least one of the levers of each pair has an extension pointing downward;
    two ramps, said ramps being joined to each other on their upper part to form a common horizontal ridge and are articulated to the body; wherein both ramps are moveable,
    two fixed plates for temporary feed support, one plate located at a lower edge of a first ramp and one plate located at a lower edge of a second ramp;
    a first cam having its lower end joined to a first horizontal shaft, wherein at least one end of the first horizontal shaft extends outward and into contact with the extension of the at least one of the first pair of levers, and has its upper end articulated to a second horizontal shaft; and
    a second cam having its lower end joined to a third horizontal shaft, wherein at least one end of the third horizontal shaft extends outward and into contact with the extension of the at least one of the second pair of levers, and has its upper end articulated to a fourth horizontal shaft; and
    a vertical pipe that can be moved upward and downward, wherein the second and fourth horizontal shafts are joined to the vertical shaft.

2. The feed dosing and regulating system of claim 1, further comprising:
    a vertical shaft that can be slid on the inside of the vertical pipe can rotate in a horizontal plane; and
    an eccentric wheel at the lower end of the shaft;
    wherein the wheel is capable of being positioned between the two ramps.

3. The feed dosing and regulating system of claim 2, further comprising a motor capable of turning the vertical shaft.

4. The feed dosing and regulating system of claim 3, further comprising:
    a feeder hopper located above the body;
    a tilting flap articulated at its upper end to an inside of said feed hopper; and
    a tilting rod articulated to one of the levers that is in contact with the tilting flap.

5. The feed dosing and regulating system of claim 4, further comprising a tray for receiving feed located below the body,
    wherein the tray includes a central part projecting outwards and sloping towards an edge of the tray to form a feed collection channel.

6. The feed dosing and regulating system of claim 1, further comprising:
    a feeder hopper located above the body;
    a tilting flap articulated at its upper end to an inside of said feed hopper; and
    a tilting rod articulated to one of the levers that is in contact with the tilting flap.

7. The feed dosing and regulating system of claim 6, further comprising a tray for receiving feed located below the body,
    wherein the tray includes a central part projecting outwards and sloping towards an edge of the tray to form a feed collection channel.

8. The feed dosing and regulating system of claim 6, further comprising:
    a feeder hopper located above the body;
    a tilting flap articulated at its upper end to an inside of said feed hopper; and
    a tilting rod articulated to one of the levers that is in contact with the tilting flap.

9. The feed dosing and regulating system of claim 8, further comprising a tray for receiving feed located below the body,
    wherein the tray includes a central part projecting outwards and sloping towards an edge of the tray to form a feed collection channel.

10. The feed dosing and regulating system of claim 6, further comprising a tray for receiving feed located below the body,
    wherein the tray includes a central part projecting outwards and sloping towards an edge of the tray to form a feed collection channel.

11. The feed dosing and regulating system of claim 1, further comprising a tray for receiving feed located below the body,
    wherein the tray includes a central part projecting outwards and sloping towards an edge of the tray to form a feed collection channel.

12. A feed dosing and regulating system for troughs, comprising:
    a body,
    an outer rod,
    a pair of vertical levers, wherein one end of the rod is joined to one of the vertical levers and the other end of the rod is joined to the other vertical lever;
    wherein the levers face each other and are articulated to the body; and wherein at least one of the levers has an extension pointing downward;
    a moveable ramp that is articulated to the body;
    a fixed plate for temporary feed support, which is located at a lower edge of the ramp;

a cam, which has its lower end joined to a first horizontal shaft, wherein at least one end of the first horizontal shaft extends outward and into contact with the extension of the at least one of the levers, and the cam has its upper end articulated to a second horizontal shaft; and a vertical pipe that can be moved upward and downward, wherein the second horizontal shaft is joined to the vertical shaft.

13. The feed dosing and regulating system of claim 12, further comprising:

a vertical shaft that can be slid on the inside of the vertical pipe can rotate in a horizontal plane; and an eccentric wheel at the lower end of the shaft;

wherein the wheel is capable of being positioned adjacent to the ramp.

14. The feed dosing and regulating system of claim 13, further comprising a motor capable of turning the vertical shaft.

15. The feed dosing and regulating system of claim 14, further comprising:

a feeder hopper located above the body;

a tilting flap articulated at its upper end to an inside of said feed hopper; and a tilting rod articulated to one of the levers that is in contact with the tilting flap.

16. The feed dosing and regulating system of claim 15, further comprising a tray for receiving feed located below the body.

wherein the tray includes a central part projecting outwards and sloping towards an edge of the tray to form a feed collection channel.

17. The feed dosing and regulating system of claim 9, further comprising a tray for receiving feed located below the body, wherein the tray includes a central part projecting outwards and sloping towards an edge of the tray to form a feed collection channel.

* * * * *